Oct. 29, 1963  R. D. DE WAARD ETAL  3,109,097
IMMERSED THERMISTOR BOLOMETERS WITH RADIATION
IMPERIROUS MASK ON BACK OF ACTIVE AREA
Filed Sept. 28, 1961

FIELD ANGLE

INVENTORS
RUSSELL D. DE WAARD
DONALD W. FISHER
BY  ANDREW HVIZDAK

Robert Ames Norton

ATTORNEY

United States Patent Office 3,109,097
Patented Oct. 29, 1963

3,109,097
IMMERSED THERMISTOR BOLOMETERS WITH RADIATION IMPERVIOUS MASK ON BACK OF ACTIVE AREA
Russell D. De Waard, Old Greenwich, Donald W. Fisher, Norwalk, and Andrew Hvizdak, Old Greenwich, Conn., assignors to Barnes Engineering Company, Stamford, Conn., a corporation of Delaware
Filed Sept. 28, 1961, Ser. No. 141,469
8 Claims. (Cl. 250—83.3)

This invention relates to improved thermistor bolometers and particularly to improved immersed thermistor bolometers.

Thermistor bolometers have achieved wide practical use as detectors in the infrared as they can be used in both near and far infrared which is not true of other types of detectors. Throughout the present specification and claims the term "thermistor" is used in its common general sense as a detector the resistance of which changes with temperature. It is not intended to limit the invention to bolometers in which the detector thermistor is a semiconductor made up of oxides such as oxides of manganese and nickel. This restricted meaning has sometimes been applied to the term "thermistor" but in the present case the term is used broadly and includes other resistors which have high temperature coefficients, for example, thin films of germanium, silicon and the like.

Most successful bolometers require a rapid heating and cooling of the thermistor either by chopping the radiation received or by viewing or scanning rapidly. Wherever thermistors have to be rapidly heated and cooled it is necessary to provide a heat sink. This may be any block of material of good heat conductivity and more particularly for bolometers of maximum sensitivity, lenses of materials of good heat conductivity on which the thermistor is immersed. In its broadest aspects the present invention includes either type of bolometer but as its greatest utility is in immersed bolometers, the advantages of the invention will be generally described in connection with this preferred modification.

Thermistors, and particularly thermistors immersed on lenses, are quite small. In fact it is one of the advantages of immersed bolometers that the size of the thermistors can be greatly reduced. This raises two problems with immersed bolometers and one problem with unimmersed bolometers having ordinary heat sink blocks.

The first problem, which is primarily although not exclusively encountered in immersed bolometers, is a thermal one. A thermistor flake is always provided with electrodes and it is the portion of the thermistor flake between electrodes which constitutes the effective area. The portion under the electrodes is in effect short circuited by them and does not contribute to thermistor sensitivity and response. However, the portion of the thermistor covered by the electrodes creates a thermal problem. Any heating of this portion of the thermistor raises its temperature and results in lateral conduction of heat to the active portion of the thermistor flake. This results in a blurring of the thermistor response and in a reduced sensitivity because ideally the thermistor should only be heated by the rays of infrared radiation actually striking the active portion thereof. Throughout the present specification the dimension of the active portion of the flake or, if it is not uniform, the longer dimension will be referred to as "L". With very thin thermistors "L" may be very large in comparison to the thickness of the thermistor and so the conduction of heat from the portions of the thermistor not exposed to radiation may in such instances be quite small. However, particularly in the case of immersed bolometers, the whole object of immersion is to increase sensitivity by making the active area of the thermistor much smaller than it ordinarily would be. At the same time the thickness of the thermistor cannot be significantly reduced for it is always made quite thin and there are, of course, practical limits below which the resulting flakes are either mechanically or electrically unsatisfactory. With the oxide thermistors which have been used primarily in the past the thickness is a number of microns, for example, $10\mu$ or more. Recent work has brought out a different type of thermistor namely thin layers of germanium or silicon. This is described in the patent of De Waard, No. 2,994,053. These thermistors can be made quite thin and the thermal effect referred to above is therefore not as serious a factor as with the thicker oxide thermistors.

A second effect which is of optical nature and which is encountered both in immersed and unimmersed bolometers results from the fact that rays which would not ordinarily strike the active area of the thermistor flake may be bent so that they strike its edges or portions under the electrodes. They thus reduce the resolution of the image on the detector and have a blurring effect as well as lowering sensitivity. In the case of an immersed bolometer these rays act as if the thermistor had a larger area. In the case of unimmersed bolometers the effect is primarily an edge effect. In either case it is undesirable. In the case of the immersed bolometer sensitivity in general rises in inverse proportion to the square root of the active area of the thermistor flake. In square flakes or flakes which are almost square the sensitivity may therefore be considered as roughly inversely proportional to the magnitude of "L". The mechanism by which the unwanted rays strike the thermistor flake will be brought out more clearly in conjunction with the description of the drawings which illustrate it. At this point it is sufficient to state that it is undesirable and that the problem is solved by the present invention.

According to the present invention the lens of an immersed bolometer or the heat sink of an unimmersed bolometer is covered with a thin coating which is substantially opaque to the infrared radiations involved and which is provided with a small, accurately dimensioned window over or under which the active portion of the thermistor lies. The present invention prevents rays from being optically directed onto the edges or unactive portions of the thermistor flake. Accordingly these portions are not heated by the rays and the adverse effects which are set out above are completely eliminated. A higher resolution bolometer results and one of improved sensitivity of response.

The present invention is not concerned primarily with the processes by which the infrared opaque shield with the window opposite the active area of the thermistor flake is produced. However, in a specific aspect a particularly effective process is included in the present invention. Most metals, as opposed to semiconductor elements such as germanium, silicon and the like, are quite opaque to infrared radiation and, therefore, a thin layer will effectively block such radiation. This thin layer, which may even be a micron or less, makes it possible to produce an accurately dimensioned shielding layer by metal deposition in a vacuum. All that is necessary is to provide an accurate area to which the metal does not adhere and which corresponds to the desired window. The heat sink or the lens is then coated by vacuum deposition with a suitable metal and the window area remains uncoated. The metal to be used is not critical and various metals such as aluminum, gold and the like may be employed using ordinary vacuum deposition techniques for producing mirrors. Because of its cheapness and the ease with which it can be vacuum deposited aluminum presents advantages but, of course, the invention is in no sense concerned with the particular radiation barrier layer used.

In the case of an immersed bolometer the metal coating on the lens constitutes an excellent infrared mirror so that rays which would strike the thermistor under its electrodes or which would be turned into the thermistor optically are simply reflected. In the case of unimmersed bolometers the protective shield need not be a mirror. In fact sometimes it is preferable to use a blackened shield. The optical problem is a little different as in the immersed bolometer a mirrored coating rejects the unwanted rays which are reflected back out through the lens, whereas in the unimmersed bolometer there may be some unwanted surface reflection. The essential feature of the present invention in both cases is the prevention of unwanted rays from striking the portions of the thermistor which are not active or in the case of immersed bolometers even sometimes rays which are turned to strike the active portion of the thermistor but which would blur or distort the field of view.

The invention will be described in greater detail in conjunction with the drawings in which.

Figure 1:
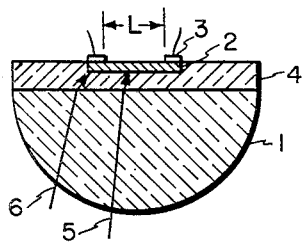
FIG. 1 is a cross-section through an ordinary immersed bolometer in the long direction of the thermistor.

FIG. 1 illustrates an ordinary immersed bolometer using a germanium lens 1. The thermistor 2 is shown with electrodes 3 mounted in the customary insulating selenium layer 4. Thermistor and insulating layer thicknesses are greatly exaggerated for clarity. It will be apparent that some of the rays of radiation will strike the active part of the flake as represented by the dimension "L" the ray being designated 5. The ray to the side designated 6 strikes a portion of a thermistor under the gold electrode 3 and therefore heats up this portion of the thermistor resulting in a lateral transmission of heat into the active portion of the thermistor with the undesirable blurring and widening of the field angle which has been referred to.

Figure 2:
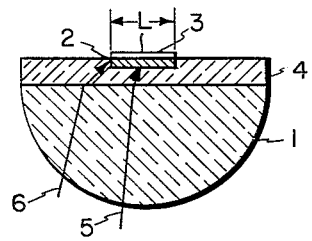
FIG. 2 is a similar cross-section at right angles through the short dimension of the thermistor.

FIG. 2 shows a cross-section at right angles to FIG. 1, the same elements bearing the same reference numerals. It will be noted that this section is across the thermistor 2 and as illustrated this particular thermistor had a square active area. Again ray 5 strikes the active area of the thermistor whereas other rays 6 are bent by passing from the germanium lens of refractive index 4 into the selenium or arsenic modified selenium layer with a refractive index of about 2.5. Again as in FIG. 1 the thicknesses of the thermistor and selenium layers are exaggerated, as is the degree of bending of the rays. With a very thin thermistor and thin selenium layer, fewer rays from the side would strike the thermistor.

Figure 3:
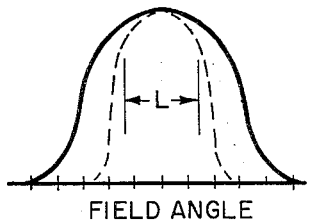
FIG. 3 is a graph showing the distortion of the field angles.

FIG. 3 illustrates a graph of the change in field angle resulting from the thermal and optical phenomena referred to above. The dimension "L" is shown on the figure with the thermal effect shown in dotted lines and the optical effect in solid lines. It will be apparent that the field angle has been greatly changed and that there is a blurring or loss in resolution by reason of the thermal and optical effects discussed above. FIG. 3 while typical in shape is not to scale. In order to show the effects more clearly the dotted lines for the thermal effect are exaggerated. Actually in the particular instances portrayed the optical effect is markedly greater than the thermal effect. Shapes of the curves will change somewhat with changes in dimensions and refractive indices of the materials of the lens and the insulating layer respectively.

Figure 4:
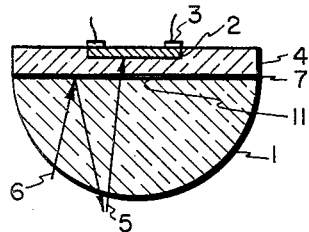
FIG. 4 is a cross-section of a bolometer according to the present invention taken in the same direction as FIG. 1.
Figure 5:
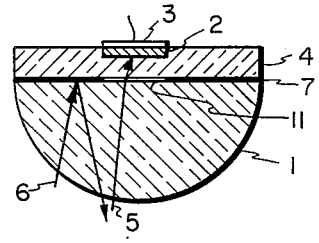
FIG. 5 is a cross-section at right angles thereto.

FIGS. 4 and 5 which are cross-sections taken in the same directions as FIGS. 1 and 2 show immersed bolometers of the present invention with a layer opaque to infrared, for example, a layer of aluminum or gold shown at 7. It will be seen that this masks off all except the active portion of the thermistor flake. Again the thermistor thickness and thickness of the selenium layer are somewhat exaggerated but the relation of the metal masking layer to the thickness of selenium and thermistor is more nearly in proportion. It will be seen in both FIGS. 4 and 5 that the unwanted rays are reflected back out through the lens and so do not strike the thermistor at all either in its active portions or the portions which are covered by the gold electrodes.

Figure 6:
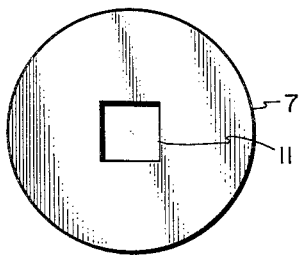
FIG. 6 is a plan view of a lens provided with a metal coating before the thermistor is mounted.

FIG. 6 shows the flat surface of the germanium lens at a point in the manufacture of the bolometer. It is shown as coated with a thin layer of aluminum 7 in which there is left a window 11 corresponding to the active area of the thermistor. After the layer has been deposited the insulating layer of selenium or arsenic modified selenium is applied and the thermistor immersed therein with its active area over the window 11. The gold electrodes can then be deposited or they may first have been deposited on the thermistor flake before immersion. This latter portion of the manufacturing procedure does not depart from ordinary immersed bolometer practice.

Figure 7:
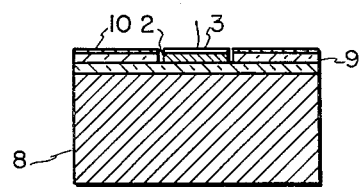
FIG. 7 is a cross-section through an unimmersed bolometer.

FIG. 7 shows an unimmersed bolometer with the same elements bearing the same reference numerals. This bolometer, however, is one with a controlled time constant. The heat sink is shown at 8 and it may be any material having suitable high conductivity such as a block of copper, fused aluminum oxide, fused beryllium oxide and the like. On this there is then deposited an accurately dimensioned film of low conductivity such as a film of polyglycolterephthalate usually sold in the name of "Mylar." The thermistor 2 is mounted on this film and a film of the same or different material surrounds the thermistor. This film is shown at 9 and it does not quite touch the edges of the thermistor unless it is an insulator. On top there is an aluminized film 10 which is coated in a manner similar to the film on the immersed bolometers but need not have a mirror finish. It should not touch the thermistor and the gap is shown exaggerated. As reflections from the side might possibly cause rays to strike the thermistor the shield may be blackened or the vacuum evaporation by which the film is produced may be carried out under operating conditions which produces a black film instead of a mirror film. The net effect is that rays are prevented from striking the edges of the thermistor flake and therefore the optical effect which has been discussed above is eliminated.

We claim:

1. A thermistor bolometer comprising in combination,
   (a) at least one thermistor flake having an active area,
   (b) a heat sink in the form of a lens on which the thermistor is immersed, and
   (c) a radiation impervious mask on the back surface of the lens positioned to intercept radiation which would otherwise strike the surface of the active area of the thermistor.

2. An immersed infrared bolometer according to claim 1 in which the lens is made up of a semiconductor element.

3. An immersed infrared thermistor bolometer according to claim 2 in which the lens is made of germanium.

4. An immersed infrared bolometer according to claim 3 in which the mask is a thin layer of infrared opaque metal on the back surface of the lens with the window of dimensions corresponding to the active area of the thermistor and an insulating layer of infrared transmitting material of high refractive index is interposed between the thermistor and the germanium lens.

5. An immersed infrared bolometer according to claim 4 in which the insulating layer comprises as its major component selenium.

6. An immersed infrared bolometer according to claim 5 in which the mask is a thin layer of aluminum.

7. An immersed thermistor bolometer according to claim 1 in which the opaque mask forms with the back surface of the lens an infrared mirror.

8. An immersed thermistor bolometer according to claim 3 in which the opaque mask forms with the back surface of the lens an infrared mirror.

References Cited in the file of this patent

UNITED STATES PATENTS

| | | |
|---|---|---|
| 2,544,261 | Gibson | Mar. 6, 1951 |
| 2,926,562 | Bretthauer | Mar. 1, 1960 |
| 2,964,636 | Cary | Dec. 13, 1960 |
| 2,994,053 | DeWaard | July 25, 1961 |